United States Patent
Kramar

(10) Patent No.: US 11,692,531 B2
(45) Date of Patent: Jul. 4, 2023

(54) PIVOT CRADLE BEARING AND METHOD FOR PRODUCING A PIVOT CRADLE BEARING

(71) Applicant: Schaeffler Technologies AG & Co. KG, Herzogenaurach (DE)

(72) Inventor: Vasyl Kramar, Grettstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 15 days.

(21) Appl. No.: 17/617,090

(22) PCT Filed: May 6, 2020

(86) PCT No.: PCT/DE2020/100378
§ 371 (c)(1),
(2) Date: Dec. 7, 2021

(87) PCT Pub. No.: WO2020/249153
PCT Pub. Date: Dec. 17, 2020

(65) Prior Publication Data
US 2022/0228579 A1   Jul. 21, 2022

(30) Foreign Application Priority Data

Jun. 14, 2019   (DE) .......................... 102019116250.5

(51) Int. Cl.
| | |
|---|---|
| *F16C 19/50* | (2006.01) |
| *F16C 33/58* | (2006.01) |
| *F16C 35/06* | (2006.01) |
| *F04B 1/2085* | (2020.01) |
| *F16C 35/063* | (2006.01) |
| *F04B 1/148* | (2020.01) |

(52) U.S. Cl.
CPC ............ *F04B 1/2085* (2013.01); *F04B 1/148* (2013.01); *F16C 19/502* (2013.01); *F16C 33/588* (2013.01); *F16C 35/063* (2013.01); *F16C 35/06* (2013.01); *F16C 2226/54* (2013.01); *F16C 2360/00* (2013.01); *F16C 2360/42* (2013.01)

(58) Field of Classification Search
CPC ...... F04B 1/148; F04B 1/2085; F16C 19/502; F16C 35/06; F16C 35/063; F16C 2226/54; F16C 2360/00; F16C 2360/42
See application file for complete search history.

(56) References Cited

U.S. PATENT DOCUMENTS

| | | | |
|---|---|---|---|
| 8,632,256 B2 * | 1/2014 | Katayama | ........... F16C 33/4635 384/560 |
| 2007/0053621 A1 * | 3/2007 | Kazama | ................ F16C 35/067 384/445 |

FOREIGN PATENT DOCUMENTS

| | | | | |
|---|---|---|---|---|
| DE | 3442391 | | 1/1986 | |
| DE | 4231560 | | 3/1994 | |
| DE | 10213520 | A1 * | 10/2002 | ............ F04B 1/2085 |
| DE | 102005034739 | | 2/2007 | |
| DE | 102010032649 | A1 * | 2/2012 | ............ F04B 1/2078 |

(Continued)

*Primary Examiner* — Phillip A Johnson
(74) *Attorney, Agent, or Firm* — Volpe Koenig

(57) ABSTRACT

A pivot cradle bearing (1) having a pivoting element (2) which is mounted to pivot in a housing (3) is provided in which an inner bearing shell (7), on which rolling bodies (4) are rolling, is held on the pivoting element (2). The inner bearing shell (7) is held by rivets (10) in a form-fitting manner on the pivoting element (2) in the circumferential direction of the bearing shell (7).

18 Claims, 2 Drawing Sheets

(56) References Cited

FOREIGN PATENT DOCUMENTS

| | | | | |
|---|---|---|---|---|
| DE | 102010032651 | 2/2012 | | |
| DE | 102013218203 | 3/2015 | | |
| DE | 102009013094 | 9/2018 | | |
| DE | 102018115554 | 1/2020 | | |
| EP | 1790872 A1 * | 5/2007 | ........... | F16D 65/183 |
| EP | 1886035 B1 * | 11/2010 | ........... | F04B 1/2085 |
| EP | 2354577 A2 * | 8/2011 | ........... | F16C 19/502 |
| JP | 2002349555 | 12/2002 | | |
| JP | 2009047217 | 3/2009 | | |
| WO | 2006122613 | 11/2006 | | |

* cited by examiner

PIVOT CRADLE BEARING AND METHOD FOR PRODUCING A PIVOT CRADLE BEARING

CROSS-REFERENCE TO RELATED APPLICATIONS

This application is the U.S. National Phase of PCT Appln. No. PCT/DE2020/100378, filed May 6, 2020, which claims priority from German Patent Application No. 10 2019 116 250.5, filed Jun. 14, 2019, the entire disclosures of which are incorporated by reference herein.

TECHNICAL FIELD

The disclosure relates to a pivot cradle bearing. The disclosure further relates to a method for producing a pivot cradle bearing.

BACKGROUND

A generic pivot cradle bearing is known, for example, from DE 10 2005 034 739 A1. It comprises a pivot lever, i.e., a pivoting element, and a housing in which the pivot lever is mounted. A bearing shell is inserted in the housing, which in the case of DE 10 2005 034 739 A1 is referred to as the outer ring segment. Another bearing shell is held on the pivot lever. Rolling bodies, which are designed as needles or rollers, roll between the bearing shells. The inner bearing shell, which is held on the pivot lever and is essentially in the form of a curved strip, is bent over at its ends in the form of projections directed toward the pivoting axis and is thus held in a form-fitting manner on the pivot lever, i.e., secured against rotation.

Another pivot cradle bearing is described in EP 1 886 035 B1. In this case, a swash plate is provided as the pivoting element. The swash plate is part of a hydraulic axial piston machine with variable throughput volume. The known pivot cradle bearing designed as a swash plate pivot bearing comprises rolling bodies guided in a cage, with a cage control integrated into rolling bearing segments of the pivot bearing. The cage control prevents the cage from slipping out of its most favorable position in the pivot bearing.

SUMMARY

The disclosure is based on the object of further developing a pivot cradle bearing compared with the aforementioned prior art, in particular with regard to production aspects.

According to the disclosure, this object is achieved by a pivot cradle bearing with one or more of the features described herein. The object is also achieved by a method for producing a pivot cradle bearing with one or more of the features described herein. The configurations and advantages explained below in connection with the production method also apply analogously to the apparatus, that is the pivot cradle bearing, and vice versa.

In a basic concept known per se, the pivot cradle bearing comprises a pivoting element which is mounted to pivot in a housing, an inner bearing shell on which rolling bodies roll being held on the pivoting element. According to the disclosure, the inner bearing shell is held in a form-fitting manner by rivets on the pivoting element in the circumferential direction of the bearing shell, i.e., in the pivoting direction. Despite the given form-fitting connection, the bearing shell can be removed from the pivoting element without causing damage. In any case, the ring segment, i.e., the bearing shell, is designed as an anti-rotation element for the pivot cradle bearing.

The riveted joint is suitable for permanently stable retention of the inner bearing shell on the pivoting element even in applications where very high forces are transmitted between the pivoting element and the housing. The pivoting element is, for example, a pivot lever or a pivot disk of a hydraulic axial piston machine, i.e., a hydraulic motor or a hydraulic pump.

According to one possible embodiment, the inner bearing shell is held to the pivoting element by exactly two rivets. The rivets are preferably arranged in areas of the inner bearing shell that are not overrun by the rolling bodies, in particular needles or cylindrical rollers. The rivets are preferably steel rivets. Alternatively, bronze, brass or another alloy is suitable for producing the rivet. In addition to solid rivets, other types of rivets such as hollow rivets can also be used. The head of the rivet, which secures the bearing shell on the pivoting element against rotation, is preferably designed as a countersunk head. The flush closure of the countersunk head with the surface of the bearing shell enables rolling bodies to roll over in principle.

The pivot cradle bearing can be produced in the following steps:
  Provisioning of a pivoting element having two recesses in a curved surface, an inner bearing shell, a housing, an outer bearing shell, and a set of rolling bodies,
  Creation of two bores in the inner bearing shell,
  Insertion of a rivet into each bore, i.e., production of a rivet connection in each case,
  Placement of the inner bearing shell, including the rivets firmly connected to it, onto the pivoting element so that the rivets engage in the recesses in the pivoting element,
  Completion of the arrangement of pivoting element and inner bearing shell by the rolling bodies, the outer bearing shell and the housing to form a pivot cradle bearing.

The recesses located in the pivoting element can be either through holes or blind holes. In the latter case, the rivets are preferably inserted in the recesses in such a way that, although displacement of the bearing shell is prevented, there is no securing function to prevent the rivets from being pulled out of the recesses. This is the case, for example, when the section of a rivet protruding from the bearing shell, i.e., the rivet foot, has the same cylindrical shape as the associated recess in the pivoting element.

In general, this means that there is a form-fitting connection between the rivet and the pivoting element with respect to loads acting in a tangential plane placed between the pivoting element and the inner bearing shell, in particular in the circumferential direction of the essentially strip-shaped bearing shell or in the longitudinal direction of the pivoting axis, while at the same time the rivet remains displaceable in its longitudinal direction, i.e., normal to the tangential plane. Rivet connections thus exist exclusively between the rivets and the inner bearing shell, but not between the rivets and the pivoting element.

In order to fasten the inner bearing shell to the pivoting element, the inner bearing shell together with the inserted rivets must be deformed somewhat elastically. As soon as the rivet feet snap into the recesses, the inner bearing shell is secured against rotation and falling off of the pivoting element and is precisely positioned. In the assembled state of the pivot cradle bearing, lifting of the inner bearing shell from the pivoting element is excluded in any case. Any displacement of the inner bearing shell relative to the pivoting element in the tangential direction is prevented by the rivets, in particular steel rivets.

The required elastic deformation of the inner bearing shell during assembly is also possible in embodiments in which the inner bearing shell has one rim or two rims. The rolling bodies, in particular needles or rollers, of the pivot cradle bearing are preferably guided in a cage. As far as the synchronization of the rolling body set and the cage with the pivoting movement of the pivoting element is concerned, a wide variety of methods of synchronization known in principle can be applied. In this context, reference is made by way of example to the publications DE 10 2009 013 094 B4 and DE 34 42 391 C1.

In addition to the inner bearing shell, the pivot cradle bearing typically has an outer bearing shell that is inserted into the housing. In principle, it is also possible to roll the rolling bodies directly on a surface of the housing. The outer bearing shell can also be attached to the housing by riveting or other means.

The bores in the inner bearing shell into which the rivets are to be inserted are preferably made in the unhardened state of the inner bearing shell. After the bores have been produced, the inner bearing shell can be hardened and ground. Only then are the rivets inserted into the inner bearing shell, creating a rigid connection between the rivets and the bearing shell that can no longer be undone without destruction. In contrast to the connection between the rivets and the inner bearing shell, the connection between the rivets and the pivoting element is detachable, as described in connection with the geometry of the rivet feet. The application of the rivets to the inner bearing shell can be done either manually or automatically.

BRIEF DESCRIPTION OF THE DRAWINGS

In the following, several exemplary embodiments according to the disclosure are explained in more detail by means of a drawing. In the figures.

DETAILED DESCRIPTION

Figure 1:
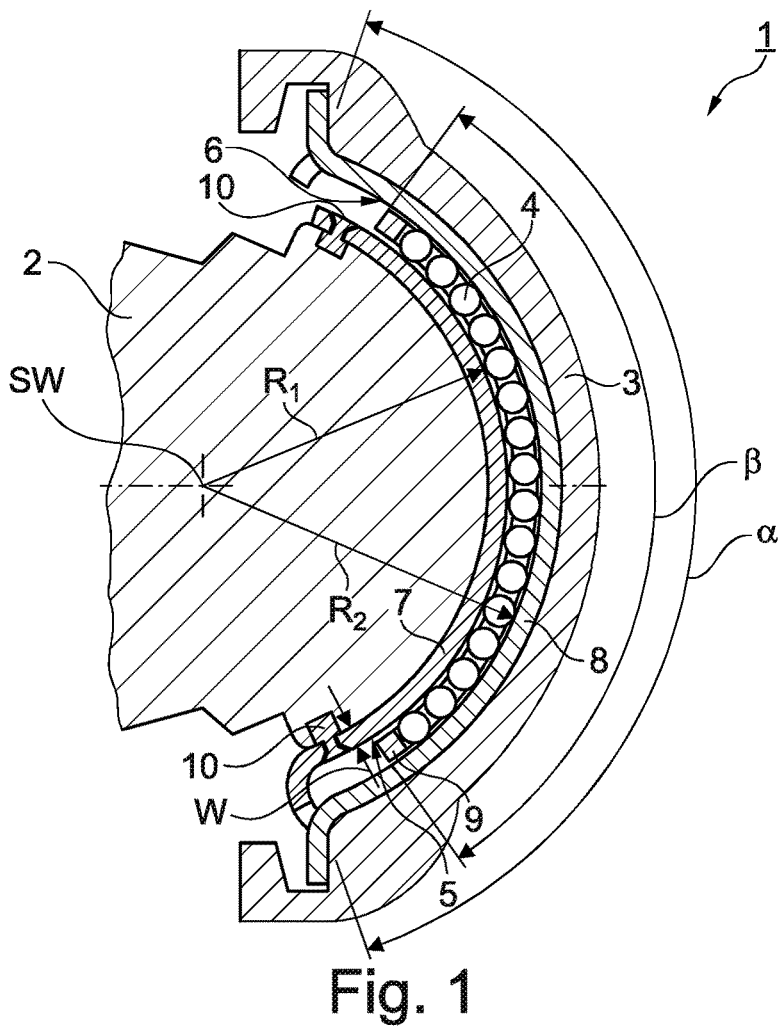
FIGS. 1 and 2 show sectional views of a first exemplary embodiment of a pivot cradle bearing.

Unless otherwise stated, the following explanations relate to both exemplary embodiments. Parts that correspond to each other or have basically the same effect are marked with the same reference symbols in all figures.

A pivot cradle bearing, identified as a whole with the reference symbol 1, comprises a pivoting element 2 which is mounted to pivot in a housing 3 by means of rolling bodies 4, namely needles or cylindrical rollers. The pivot cradle bearing 1 is installed in a hydraulic axial piston pump or an axial piston motor. By changing the angular position of the pivoting element 2 relative to the housing 3, the delivery volume of the hydraulic pump or hydraulic motor can be varied in a manner known per se. The pivoting axis of the pivoting element 2, which is also referred to as the pivot cradle, is denoted SW.

An inner rolling surface 5 for the rolling bodies 4 is provided by an inner bearing shell 7, which is held on the pivoting element 2. An associated outer rolling surface, denoted 6, is provided by an outer bearing shell 8 inserted into the housing 3. In the exemplary embodiments, the two bearing shells 7, 8 have a uniform wall thickness W. The radius of the inner rolling surface 5 is denoted by $R_1$, the radius of the outer rolling surface 6 by $R_2$.

The rolling bodies 4 are guided in a cage 9. Cage bars are denoted by 11. The rolling surfaces 5, 6 extend in the circumferential direction over an angle $\alpha$ which is greater than the angle denoted by 13 over which the cage 9 extends.

A rivet 10 is located near each end of the inner bearing shell 7, which has the overall basic shape of a curved strip, and is used to hold the inner bearing shell on the pivoting element 2 in such a way that it cannot be displaced in the circumferential direction of the bearing shell 7, i.e., in the pivoting direction.

The rivets 10 are steel rivets, each having a cylindrical rivet foot denoted 13. The rivet foot 13 engages in a blind hole 12 in the pivoting element 2, which is also cylindrical and is generally referred to as a recess.

Before the inner bearing shell 7 is attached to the pivoting element 2, the two rivets 10 are firmly connected to the inner bearing shell 7, i.e., riveted. For this purpose, the inner bearing shell 7 has two bores 14, which are already created in the unhardened state of the inner bearing shell 7. Each bore 14 has a cylindrical section 15, which is joined on the outside by a conical section 16. The conical section 16 is designed to receive a countersunk head 17 of the rivet 10. Before inserting the rivet 10 into the bore 14 while deforming the countersunk head 17, the inner ring element 7 is subjected to heat treatment, i.e., hardened and ground.

The assembly, which includes the inner bearing shell 7 and the two rivets 10, is elastically bent up when the pivot cradle bearing 1 is fitted to the pivoting element 2 until the rivet feet 13 snap into the recesses 12. In an analogous manner, subsequent removal of said assembly from the pivoting element 2 would also be possible. Due to the curvature of the inner bearing shell 7, it is held sufficiently tightly on the pivoting element 2 by means of the rivets 10 for assembly purposes and also for subsequent operation of the axial piston machine. In this case, there is no rivet connection between the rivet feet 13 and the pivoting element 2.

Figure 2:
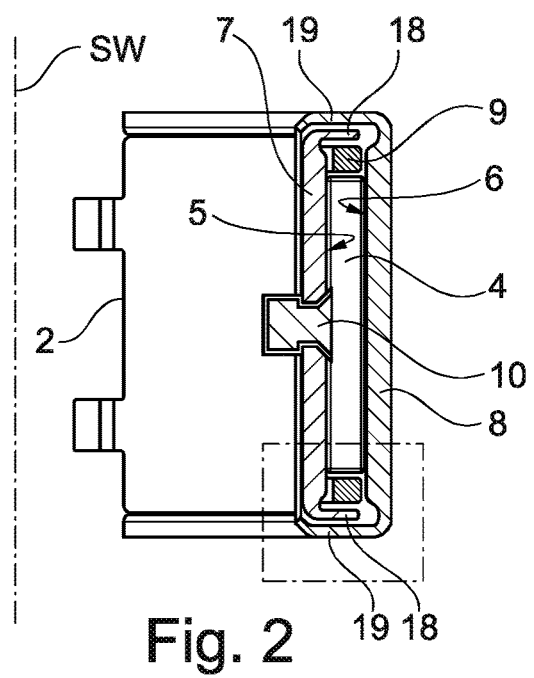
Figure 3:
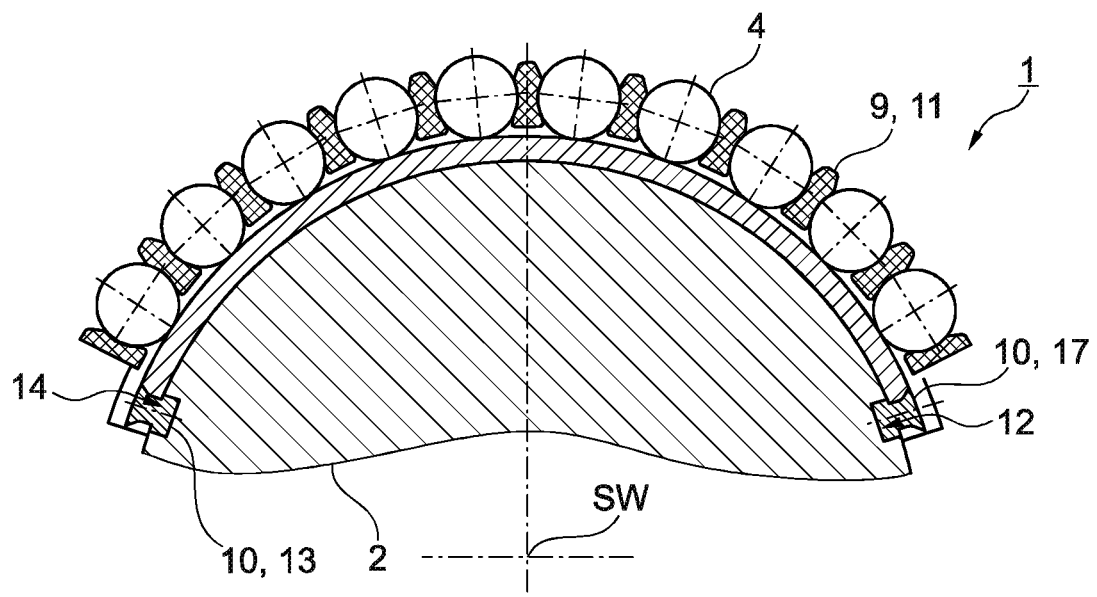
FIG. 3 shows a section of another pivot cradle bearing.
Figure 4:
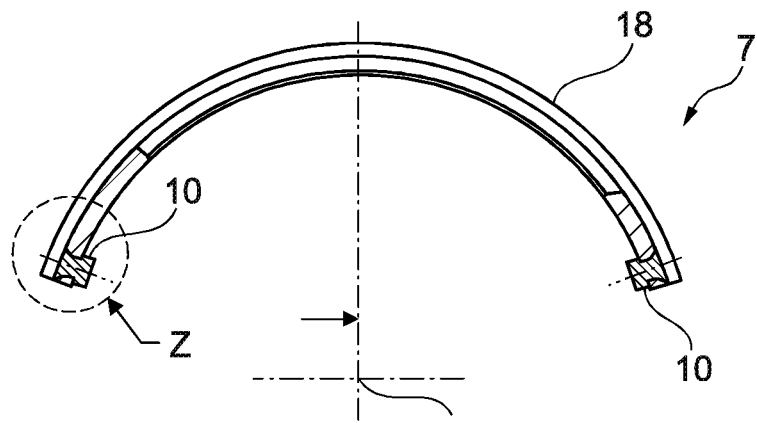
FIG. 4 shows individual components of the arrangement according to FIG. 3.
Figure 5:
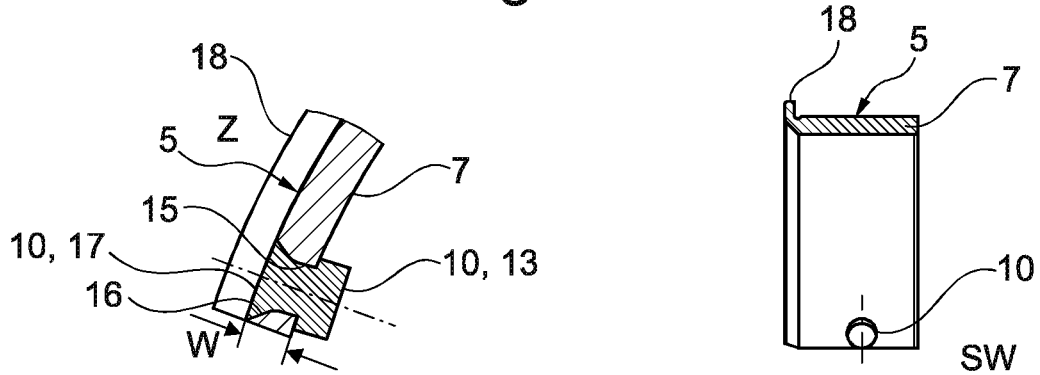
FIG. 5 shows a detail view of the arrangement according to FIG. 4.
Figure 6:
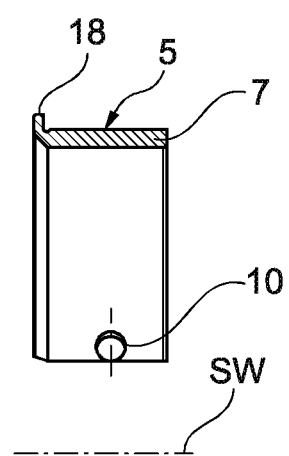
FIG. 6 shows the arrangement according to FIG. 4 in a further view.

In the exemplary embodiment according to FIGS. 1 and 2, the inner bearing shell 7 has two rims 18. In this case, two rims 19 of the outer bearing shell 8 are shaped in such a way that they partially embrace the inner bearing shell 7, so that a captive unit is formed by the bearing shells 7, 8. In the arrangement shown in FIG. 2, a rolling body 4 is visible directly on a rivet 10. In fact, in a preferred embodiment, rolling over of the rivets 10 by the rolling bodies 4 is avoided.

Also in the exemplary embodiment according to FIGS. 3 to 6, the sections of the inner bearing shell 7 in which the rivets 10 are arranged are preferably not used for rolling over by rolling bodies 4. In contrast to the exemplary embodiment according to FIGS. 1 and 2, the inner bearing shell 7 in the exemplary embodiment according to FIGS. 3 to 6 has only a single rim 18, with a groove-shaped recess with a transition radius being provided between the rolling surface 5 and the rim 18. In both exemplary embodiments, the movement of the cage 9 during operation of the pivot cradle bearing 1 is synchronized with the pivoting movement of the pivoting element 2 by means not shown and known per se.

LIST OF REFERENCE SYMBOLS

1 Pivot cradle bearing
2 Pivoting element
3 Housing
4 Rolling body
5 Inner rolling surface
6 Outer rolling surface
7 Inner bearing shell
8 Outer bearing shell
9 Cage
10 Rivet
11 Cage bar
12 Recess, blind hole
13 Rivet foot
14 Bore
15 Cylindrical section of the bore
16 Conical section of the bore
17 Countersunk head
18 Rim of the inner bearing shell
19 Rim of the outer bearing shell
$\alpha$, $\beta$ Angle
$R_1$, $R_2$ Radius
SW Pivoting axis
W Wall thickness

The invention claimed is:

1. A pivot cradle bearing, comprising:
a pivoting element pivotally mounted in a housing;
an inner bearing shell held by rivets in a form-fitting manner on the pivoting element in a circumferential direction of the bearing shell; and
rolling bodies that roll on the inner bearing shell.

2. The pivot cradle bearing according to claim 1, wherein the inner bearing shell is held on the pivoting element by two rivets.

3. The pivot cradle bearing according to claim 2, wherein the rivets are arranged in areas of the inner bearing shell not rolled over by the rolling bodies.

4. The pivot cradle bearing according to claim 1, wherein each of the rivets has a rivet head formed as a countersunk head.

5. The pivot cradle bearing according to claim 1, wherein the rivets comprise steel rivets.

6. The pivot cradle bearing according to claim 1, wherein the rivets are fastened exclusively to the inner bearing shell, but not to the pivoting element, by rivet connections.

7. The pivot cradle bearing according to claim 6, wherein the rivets each have a rivet foot which is inserted displaceably in a longitudinal direction of the rivet into a recess in the pivoting element to provide a connection with a form-fit between the rivet and the pivoting element with respect to loads acting in a tangential plane placed between the pivoting element and the inner bearing shell.

8. The pivot cradle bearing according to claim 1, wherein the inner bearing shell has a single rim.

9. A method of producing a pivot cradle bearing, the method comprising:
providing a pivoting element having two recesses in a curved surface thereof, an inner bearing shell, a housing, an outer bearing shell, and a set of rolling bodies,
creating two bores in the inner bearing shell,
inserting a rivet into each bore,
placing of the inner bearing shell on the pivoting element so that the rivets engage in the recesses in the pivoting element,
arranging the pivoting element and inner bearing shell onto the rolling bodies, the outer bearing shell and the housing to form the pivot cradle bearing.

10. The method according to claim 9, further comprising heat treating the inner bearing shell bores have been created and before the rivets are inserted.

11. A pivot cradle bearing, comprising:
a pivoting element pivotally mounted in a housing;
an inner bearing shell held by rivets with a form-fit to the pivoting element in a circumferential direction of the bearing shell;
an outer bearing shell supported by the housing; and
rolling bodies that roll on the inner bearing shell.

12. The pivot cradle bearing according to claim 11, wherein the inner bearing shell is held on the pivoting element by two rivets.

13. The pivot cradle bearing according to claim 12, wherein the rivets are arranged in areas of the inner bearing shell not rolled over by the rolling bodies.

14. The pivot cradle bearing according to claim 11, wherein each of the rivets has a rivet head formed as a countersunk head that is recessed into a surface of the inner bearing shell.

15. The pivot cradle bearing according to claim 11, wherein the rivets comprise steel rivets.

16. The pivot cradle bearing according to claim 11, wherein the rivets are fastened exclusively to the inner bearing shell, but not to the pivoting element, by rivet connections.

17. The pivot cradle bearing according to claim 16, wherein the rivets each have a rivet foot which is inserted displaceably in a longitudinal direction of the rivet into a recess in the pivoting element to provide a connection with a form-fit between the rivet and the pivoting element with respect to loads acting in a tangential plane placed between the pivoting element and the inner bearing shell.

18. The pivot cradle bearing according to claim 11, wherein the inner bearing shell has a single rim.

* * * * *